(No Model.) 4 Sheets—Sheet 1.
F. BOWER.
MOWER.
No. 593,561. Patented Nov. 16, 1897.
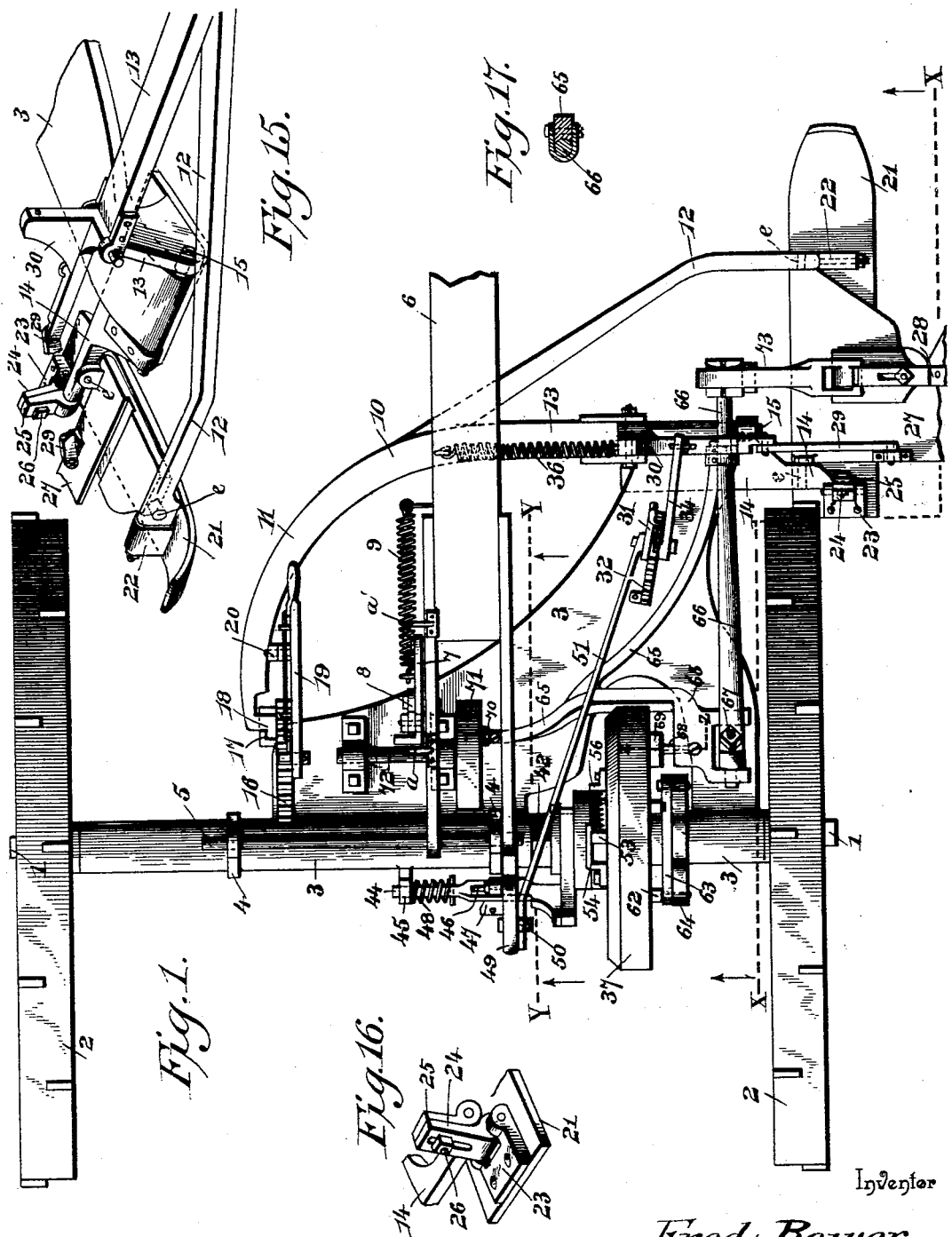
Witnesses:
Jas. K. McCathran
V. B. Hillyard
Inventor
Fred Bower
By his Attorneys,
C. A. Snow & Co.

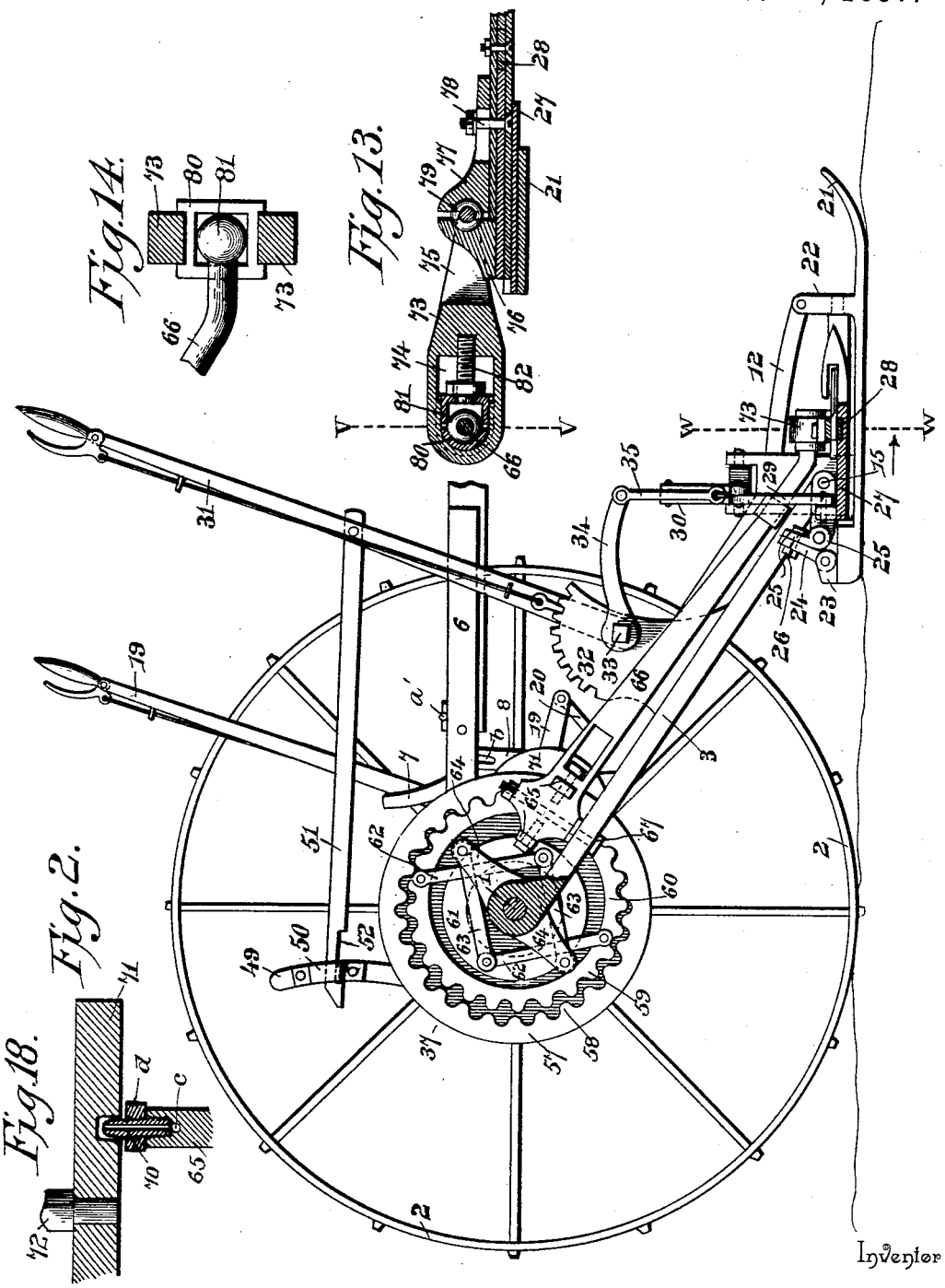

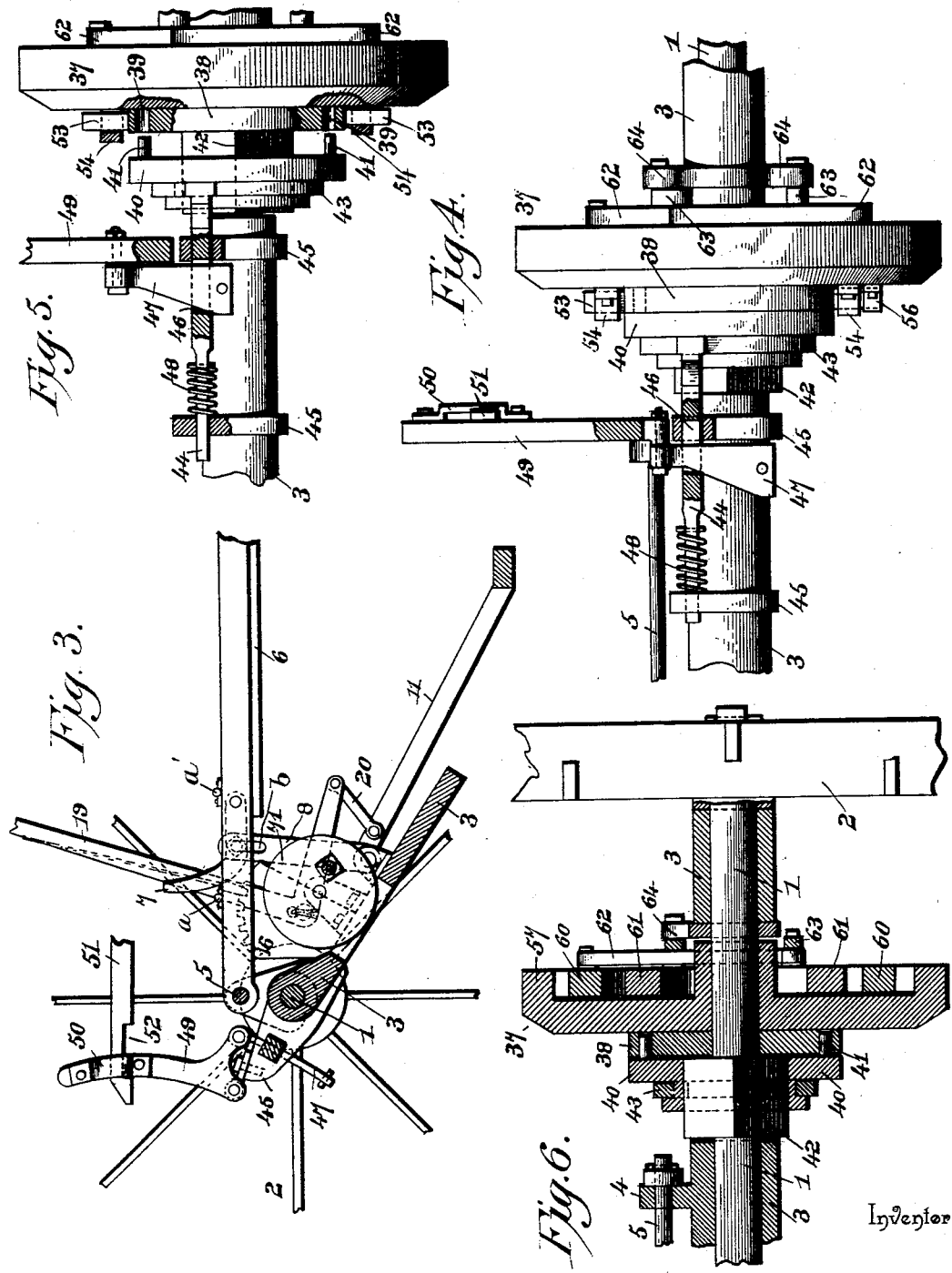

(No Model.) 4 Sheets—Sheet 4.
F. BOWER.
MOWER.
No. 593,561. Patented Nov. 16, 1897.
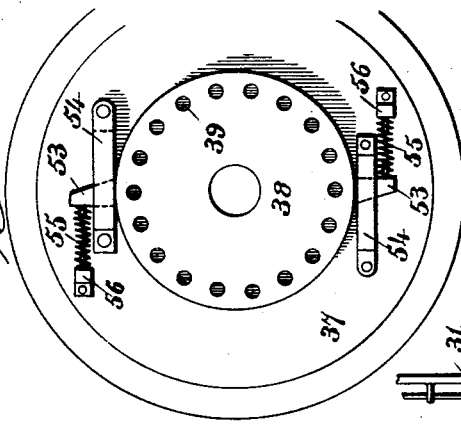
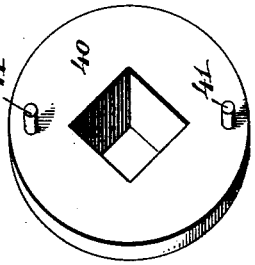
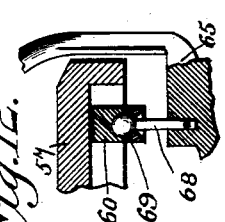
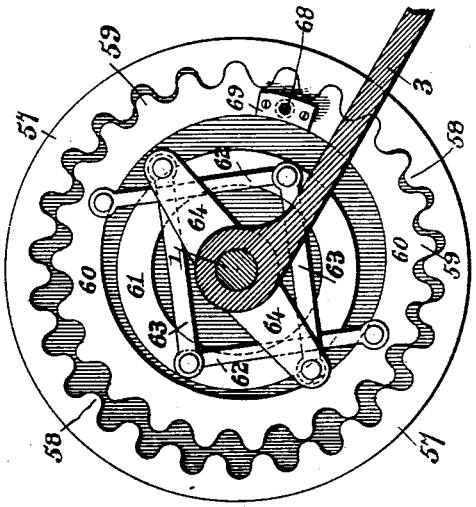
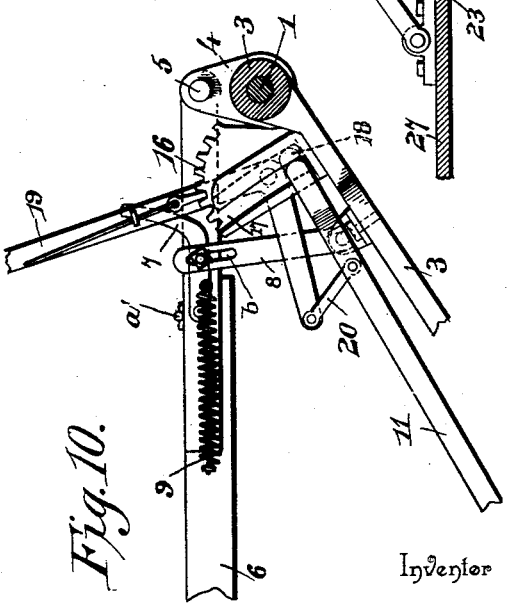
Witnesses
Jas. K. McCathran
V. B. Hillyard
By his Attorneys,
C. A. Snow & Co.
Inventor
Fred Bower

UNITED STATES PATENT OFFICE.

FRED BOWER, OF DANCY, WISCONSIN.

MOWER.

SPECIFICATION forming part of Letters Patent No. 593,561, dated November 16, 1897.

Application filed September 11, 1896. Serial No. 605,509. (No model.)

*To all whom it may concern:*

Be it known that I, FRED BOWER, a citizen of the United States, residing at Dancy, in the county of Marathon and State of Wisconsin, have invented a new and useful Mower, of which the following is a specification.

In mowing and harvesting machines it is a desideratum to provide for the adjustment of the cutting apparatus, so as to present the finger-bar at a greater or less inclination to the ground, to elevate the finger-bar to clear obstructions, and to reduce the width of the machine to enable it to pass through openings in an inclosure or fence of a width corresponding to about the distance apart of the ground-wheels, to raise and lower the cutting apparatus to cut the grain at any required elevation above the ground, and to drive the sickle-bar at a comparatively high rate of speed, so as to effect a clean and quick cut of the grain while the machine is being propelled over the field leisurely or at a moderately slow gate.

The invention consists of a novel combination of elements for simultaneously elevating or folding the cutter-bar and throwing the finger mechanism out of gear, a mechanism for increasing the movements of the sickle-bar, so that one revolution of the axle will reciprocate the sickle-bar a number of times, universal and adjustable joints between the movable parts, whereby the coöperating elements can be driven at any adjusted position and backlash and rattling obviated, and in the general construction and arrangement of the parts, all as will appear more fully hereinafter and set forth in the claims.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a mowing-machine having the improvements applied, the pole and finger-bar being broken away. Fig. 2 is a longitudinal section on the line X X of Fig. 1, looking in the direction of the arrow. Fig. 3 is a detail section on the line Y Y of Fig. 1, looking in the direction of the arrow. Figs. 4, 5, and 6 are detail views of the clutch mechanism for throwing the cutting apparatus into and out of gear. Fig. 7 is a detail view in elevation of the means for increasing the movement of the axle, so as to drive the cutting apparatus at the desired rate of speed. Figs. 8 and 9 are detail views of parts of the clutch members. Fig. 10 is a detail view in elevation of the means for regulating the pitch of the cutting apparatus and elevating the front end of the main frame to clear obstructions. Fig. 11 is a front view of the mechanism for elevating or folding the finger-bar. Fig. 12 is a sectional detail of the connection between the oscillating lever and its actuating part about on the line Z Z of Fig. 1. Fig. 13 is a detail section on the line W W of Fig. 2, viewed in the direction of the arrow. Fig. 14 is a section on the line V V of Fig. 13. Fig. 15 is a detail perspective view of the shoe, the inner end of the finger-bar, and the parts intimately associated therewith. Fig. 16 is a detail perspective view of the adjustable connections between the rear end of the shoe and its supporting-frame. Fig. 17 is a detail view in section of the connection provided between the front ends of the oscillating lever and the vibrating arm. Fig. 18 is a detail view of the connection between the oscillating lever and the vibrating guide.

Corresponding and like parts are referred to in the following description and indicated in the several views of the accompanying drawings by the same reference-characters.

The axle 1 is provided at its ends with ground-wheels 2, which are adapted to act in the capacity of drivers to positively rotate the axle when the machine is advanced over the field, as is usual in this class of implements. A frame 3 is loosely mounted upon the axle 1 and is provided with ears 4, which are apertured to receive a rod 5, to which is connected the pole or tongue 6, the latter being provided with a foot-lever 7, which is pivoted thereto at its front end and which is connected by means of a link 8 with the said frame 3, whereby the front end of the frame 3 can be raised by forward pressure of the foot against the rear side of the vertical portion of the lever 7. A spring 9 is interposed between the front end of the foot-lever 7 and pole 6 to assist materially in the operation of moving the frame when pressure is applied by means of the foot upon the said lever 7. The rear end of the spring 9 connects with the lever 7 in the rear of its pivotal connection with the pole and normally holds the lever 7 against the rear stop $a$, the forward movement of the lever being limited by a corresponding stop $a'$, both stops being secured to the pole 6. The link 8 has a slot $b$, through which the connection between it and the lever 7 passes and whereby provision is had for the front end of the frame 3 rising and falling to adapt itself to the inequalities of the ground without disturbing the lever 7. The frame 3 inclines forwardly and downwardly toward its front end, and its rear portion is cut away to provide clearance for the clutch mechanism, which is mounted upon the axle and by means of which power is derived from the axle and imparted to the cutting apparatus.

A frame 10, comprising a rearwardly-curved arm 11, a front arm 12, and a rear arm 13, extending about parallel with the front portion of the arm 12 and terminating in a pendent bracket portion 14, has pivotal connection with the lower front end of the frame 3 by means of a pin 15, passing through a transverse opening in the front end of the frame 3 and through projecting portions of the pendent portion 14. The pivotal connection between the frame 10 and the frame 3 is about in a plane passing vertically through the arm 13, and the curved arm 11 extends in the rear thereof and is adapted to be raised and lowered, so as to tilt the frame 10, and thereby vary the pitch of the cutting apparatus carried thereby. A notched segment 16 is provided at the rear end of the frame 3 and has an undercut slot 17 in one face, in which is fitted the L-shaped end 18 of the curved arm 11, so as to direct the latter in its vertical movements, and to this notched segment is fulcrumed an operating-lever 19, having the usual hand-latch to interlock with the teeth of the segment 16, so as to hold the lever 19 in the adjusted position, the said lever 19 being connected by a link 20 with the rear end of the arm 11, whereby the latter is adapted to be raised and lowered to effect the desired adjustment of the cutting apparatus.

The shoe 21 has a vertical extension 22 near its front end, which is mounted upon the extremity of the arm 12, and is provided at its rear end with a block 23, to which a plate 24 is pivotally connected, a companion plate 25 being adjustably connected with the plate 24 by means of a bolt 26, operating in a slot of the plate 24, and said plate 25 being mounted upon the extremity of the pendent portion 14, thereby enabling the rear end of the shoe to be raised and lowered, so that it may be set to run squarely upon the ground and adapt itself to the position of the pivoted frame 10.

The finger-bar 27 has pivotal connection at its inner end at $e$ with the parts 12 and 14 of the frame 10 and is of the usual construction, and the sickle-bar 28 is mounted to reciprocate thereon and coöperates therewith to form the cutting apparatus, and a link 29 connects the heel portion of the finger-bar with a substantially bell-crank lever 30, fulcrumed to the part 13 of the pivoted frame 10 and connected to a hand-lever 31, by means of which the finger-bar is adapted to be elevated or folded. A notched segment 32 is secured to the frame 3 and supports a stub-shaft 33, to one end of which the hand-lever 31 is secured and to the opposite end of which an arm 34 is attached and connected by a link 35 with the bell-crank lever 30. The hand-lever 31 is supplied with the usual hand-latch to engage with the teeth of the segment 32, so as to hold the finger-bar at the required elevation. A counterbalancing-spring 36 is interposed between the vertical portion or member of the bell-crank lever 30 and the frame 10 and serves to lessen the effort required for moving the finger-bar by means of the lever 31.

The clutch mechanism consists of a disk 37, loosely mounted upon the axle 1, a plate 38, placed adjacent to the disk 37 and having a series of openings 39, a companion plate 40, having pins 41 to enter corresponding openings 39, and an angular portion 42, formed on the axle 1 and having the plate 40 mounted thereon, so as to move toward and from the plate 38, whereby the pins 41 may be caused to enter or be withdrawn from the openings 39. The plate 40 has a lateral extension or hub which is grooved to receive the fork 43 of a shipper-bar 44, which is actuated to bring the parts of the clutch into or out of engagement. The shipper-bar 44 is slidingly mounted in ears 45, extending rearwardly from the frame 3, and has a slot 46, through which operates a wedge 47, by means of which the shipper-bar is moved against the action of the spring 48, mounted thereon, so as to separate the parts of the clutch. The wedge 47 has a straight edge which obtains a bearing against the contiguous ear 45 and is pivotally connected to the horizontal member of a bell-crank lever 49, fulcrumed to an extension of the ear 45, against which the wedge 47 obtains a bearing. A keeper 50 is secured to a side of the vertical member of the bell-crank lever 49, and the rear end portion of a bar 51 operates through the keeper 50 and is connected at its front end with the hand-lever 31, so that when actuating the lever 31 to elevate or fold the cutter-bar the lever 49 will be moved at the same time and, through the connections just described, throw the cutting apparatus out of gear. The rear end of the bar 51 is notched at 52, providing shoulders to engage with the lower portion of the keeper 50, so as to effect a positive movement of the lever 49, and this notch 52 is of such length and so disposed as to admit of the hand-lever 31 being moved so as to nearly fold or lower the finger-bar prior to the engagement of the bar with the lever, so as to effect a movement of the clutch. When the free end of the hand-lever 31 is drawn back, the bar 51 is moved rearwardly, and when the finger-bar is nearly folded the shoulder at the front end of the notch 52 will engage with the keeper 50 and actuate the lever 49, so as to cause the wedge 47 to move upward and push the shipper-bar 44 away from the clutch and carry the plate 40 away from the plate 38, thereby disconnecting the parts of the clutch, and upon moving the upper end of the said lever 31 forward, so as to lower the finger-bar, the spring 48, previously compressed, will regain itself and move the shipper-bar 44, so as to bring the parts of the clutch in gear, after which the shoulder at the rear end of the notch 52 engages with the lever 49, so as to move it to lower the wedge 47. The disk 37 and plate 38 have a limited play relative to each other, and projections 53 of the plate 38 operate through keepers 54, attached to the disk 37, and springs 55 are interposed between the projections 53 and corresponding projections 56, attached to or formed with the disk 37, whereby the initial movement imparted to the plate 38 when throwing the parts of the clutch in gear is gradually transmitted to the disk 37 through the interposed springs 55. This construction obviates throwing the working parts instantly into gear when the parts of the clutch are brought together and prevents the sudden jar and strain which would result by throwing the disk 37 directly into gear with the axle 1, as will be readily understood.

The disk 37 is formed with a rim 57, which is internally toothed, the cogs 58 and the depressions between the cogs being of similar formation and rounded so as to admit of the companion cogs 59 on a ring 60 riding out of engagement therewith. The ring 60 is placed within the rim 57 and is smaller by so much as to admit of the coöperating cogs 58 and 59 clearing one another at one side and intermeshing at the diametrically opposite side of the rim and ring. An annulus 61 is located within the ring 60 and is connected with the latter by links 62, other links 63 connecting the annulus and links 62 with arms 64, extending in opposite directions from the frame 3. The links 62 and 63, by reason of their connection with the frame 3, annulus 61, and ring 60, hold the parts 60 and 61 in fixed relation and admit of these parts moving so as to impart a vibratory movement to the ring 60, which movement is transmitted to an oscillatory lever 65 and a vibrating arm 66 in the manner presently to be described.

It is not absolutely necessary that the parts occupy the position illustrated so long as the cogs of the coöperating parts 57 and 60 coöperate to effect a vibratory movement of the part 60. In proportioning the parts one will be provided with a greater number of cogs than the other, so that when some of the cogs are in mesh the remainder are out of register and stand apart, thereby permitting the intermeshing cogs to ride past one another when the machine is in gear.

The vibrating arm 66 is pivoted at its rear end to the frame 3 by means of a bolt or pin 67, and its front end has a ball-and-socket connection with the sickle 28, so as to impart a reciprocating movement thereto. The oscillating lever 65 is journaled to the vibrating arm 66, so as to oscillate in a direction at right angles to the plane of movement of the vibrating arm 66, and is of approximately triangular form, the side adjacent to the vibrating arm being cut away, so as to lighten the lever and obviate a cumbersome appearance. The rear portion of the oscillating lever has a laterally-extending journal 68, terminating in a ball to work in a socket formed in a bearing 69, attached to the ring 60, and this journal forms positive connection between the parts 60 and 65. A wheel 71, secured to a shaft 72, mounted in bearings rising from the frame 3, receives the terminal of the rear portion of the oscillating lever 65 and forms a vibrating guide to assist in giving the proper movement to the lever 65 when the machine is in gear. A journal 70 is screwed into the end of the part 65 and works in an opening in the wheel 71 and has an opening which communicates with an oil-duct $c$ in the part 65, by means of which a lubricant is fed to the surfaces between the parts 70 and 71. A jam-nut $d$ serves to secure the journal in place.

A link 73 connects the front end of the vibrating arm 66 with the sickle-bar 28 and is provided at one end with an eye 74 and at its opposite end with an opening 75 to receive the bearing, which is attached to the sickle-bar 28 and which consists of a fixed part 76 and a movable part 77, the latter being slotted and secured in the adjusted position by a bolt 78, operating through the slot in the part 77. A ball 79 is formed on the cross-bar at the outer end of the opening 75 and obtains a bearing in a correspondingly-shaped socket formed in the meeting faces of the parts 76 and 77. A bushing 80 is located in the eye 74 and is composed of two parts, between which is formed a socket to receive the ball 81, formed at the end of the arm 66, and a set-screw 82 is provided for moving the parts of the bushing 80, so as to compensate for wear and secure a close fit between the parts 80 and 81.

The machine is propelled over the field in any of the usual ways, preferably by hitching a team to the pole or tongue 6, and when in gear the disk 37 will rotate with the axle 1, and by reason of the coöperating cogs 58 and 59 riding upon one another in the manner herein described at length the ring 60 will have imparted thereto a vibratory movement, which is transmitted to the cutting apparatus by means of the connections herein described. It it be desired to change the pitch or inclination of the cutting apparatus, the lever 19 is operated, so as to swing the frame 10 upon its pivotal connection with the frame 3, thereby tilting the shoe 21 and the cutting apparatus attached thereto. When turning the machine at the end of a swath prior to recrossing the field, or when for any purpose it is required to reduce the width of the machine, the lever 31 is operated, thereby elevating or folding the finger-bar and at the same time throwing the machine out of gear in the manner hereinbefore described, and when the machine is in position for performing service the lever 31 is moved to lower the cutting apparatus and move the wedge 47, so as to permit the machine to be thrown into gear. By operating the foot-lever 7 the front end of the frame 3 and the cutting apparatus can be elevated to clear any obstruction which may tend to work injury to the machine.

Having thus described the invention, what is claimed as new is—

1. In a mowing-machine, the combination of a frame loosely mounted at one end and adapted to rise and fall at its free end, a second frame pivoted to the free end of the loosely-mounted frame and having a rearward extension, means for relatively adjusting the two frames and holding them in an adjusted position, a shoe carried by the pivoted frame, a cutting apparatus having pivotal connection with the pivoted frame so as to fold, and actuating mechanism for the cutting apparatus supported by the loosely-mounted frame, substantially as set forth.

2. In a mowing-machine, the combination of a loosely-mounted frame, a second frame having pivotal connection with the loosely-mounted frame and having independent adjustment, a cutting apparatus having pivotal connection with the pivoted frame so as to fold, actuating mechanism for the cutting apparatus carried by the loosely-mounted frame, a shoe having pivotal connection at one end with the pivoted frame, and means for vertically adjustably connecting the other end of the shoe with the said pivoted frame, substantially as set forth.

3. In a mowing-machine, the combination of a frame inclining forwardly and downwardly, a second frame comprising front and rear arms, a rearwardly-curving arm, and a pendent bracket at the outer end of the rear arm and having said bracket pivotally connected with the lower front end of the inclined frame, means for independently adjusting the pivoted frame with reference to the inclined frame, a cutting apparatus having pivotal connection with the front arm and pendent bracket of the pivoted frame, actuating mechanism carried by the inclined frame for operating the cutting apparatus, a shoe having pivotal connection at its forward end with the front arm of the pivoted frame, and means for vertically adjustably connecting the rear end of the shoe with the said pendent bracket, substantially as set forth.

4. In a mowing-machine, the combination of a loosely-mounted frame having a notched segment formed in one side with an undercut or L-shaped slot, a second frame having pivotal connection with the first frame and having a rearwardly-extending arm formed with an L-shaped end to move in the L-slot to guide the arm in its vertical movements and hold it in place, a folding cutting apparatus and a shoe carried by the second frame, a lever pivoted to the notched segment and having a loose connection with the second frame, and means for holding the lever in an adjusted position, substantially as set forth.

5. In a mowing-machine, the combination with a frame bearing the cutting apparatus, and a shoe having pivotal connection at one end therewith, of a plate having pivotal connection at its lower end with the opposite end of the shoe, a second plate having pivotal connection with the frame, and means for vertically adjustably connecting the two plates, substantially as and for the purpose set forth.

6. In a mowing-machine, the combination of a power-driven axle, a frame mounted thereon, a folding cutting apparatus having pivotal connection with the frame, means for transmitting motion from the power-driven axle to the cutting apparatus, a clutch mechanism for throwing the cutting apparatus into and out of gear, a slidingly-mounted shipper-bar having connection with the movable clutch member, a spring for normally maintaining the parts of the clutch in engagement, a wedge operating in connection with the shipper-bar to separate the clutch members, a bell-crank lever fulcrumed to the frame and having the wedge connected therewith, an operating-lever for folding the cutting apparatus, and a bar connecting the operating-lever with the bell-crank lever and having a limited play to admit of the cutting apparatus being nearly folded before unshipping the clutch mechanism, substantially as set forth.

7. In combination, a frame having rearwardly-extending ears, a folding cutting apparatus supported by the frame, a clutch mechanism for throwing the cutting apparatus into and out of gear, a power-driven axle supporting the clutch mechanism, a slotted shipper-bar slidingly mounted in the aforesaid ears and having connection with a clutch member, a spring mounted upon the shipper-bar for normally holding the clutch members in gear, a wedge operating through the slot of the shipper-bar, a bell-crank lever mounted upon the said frame and having connection with the wedge, an operating-lever for folding the cutting apparatus, and a bar having connection with the operating-lever and having a limited movement prior to positively actuating the bell-crank lever to admit of the cutting apparatus being nearly folded prior to throwing the clutch mechanism out of gear, substantially as specified.

8. In combination, a power-driven axle, a frame loosely mounted thereon and having ears, a second frame pivotally connected with the first frame, a folding cutting apparatus carried by the second frame, a clutch mechanism for throwing the cutting apparatus into and out of gear, a shipper-bar slidingly mounted in the aforesaid ears, a spring for normally holding the clutch in gear, a wedge coöperating with the shipper-bar, a bell-crank lever having connection with the wedge, an operating-lever mounted upon the first-mentioned frame and having connection with the cutting apparatus, and provided with means for holding it in an adjusted position, and a bar having connection with the operating-lever and a limited movement with respect to the bell-crank lever, whereby a final movement of the operating-lever will simultaneously fold the cutting apparatus and throw the clutch mechanism out of gear, substantially as set forth.

9. In combination, a folding cutting apparatus, a clutch mechanism, a clutch-operating lever, a shipper-bar in connection with the movable member of the clutch mechanism, a wedge coöperating with the shipper-bar and in connection with the clutch-lever, a hand-lever for folding the cutting apparatus, and a bar having connection with the hand-lever and having a notched portion to operate in the keeper of the clutch-lever, substantially as and for the purpose set forth.

10. In combination, a power-driven axle, a disk loosely mounted thereon, keepers applied to a side of the disk, a plate loosely mounted upon the axle and having projections operating through the aforesaid keepers, other projections applied to the loosely-mounted disk, springs interposed between corresponding projections, and a second plate mounted to turn with the axle and having a movement thereon toward and from the disk and provided with means to interlock with the first-mentioned plate, substantially as set forth for the purpose described.

11. In a mowing-machine, the combination of the main frame mounted to turn upon the axle, a second frame having pivotal connection with the main frame and carrying the cutting apparatus, a pole or tongue having pivotal connection with the main frame, means for relatively adjusting the two frames, a foot-lever fulcrumed to the pole, a link connecting the foot-lever a distance from its fulcrum with the main frame and having a limited play to admit of said frame adapting itself to the surface condition of the ground, and a spring connected at one end with the pole and at its opposite end with the foot-lever at a point between its fulcrum and the point of connection therewith of the link, substantially as described for the purpose set forth.

12. In a mowing-machine, the combination of a main frame mounted to turn upon the axle, a second frame having a sliding pivotal connection with the main frame, means for adjusting the pivoted frame with reference to the main frame and directing it in its movements, a pole having pivotal connection with the main frame, a foot-lever fulcrumed to the pole, a spring connecting the foot-lever with the pole, and a link having pivotal connection with the main frame and sliding connection with the foot-lever at a point between its fulcrum and the point of connection therewith of the spring, substantially as set forth for the purpose specified.

13. The herein-described means for imparting a reciprocating movement to the cutting apparatus of mowing-machines, consisting of a rotatable rim, a ring, coöperating cogs between the rim and ring, a power-driven annulus or part, and links connecting the annulus or power-driven part with the ring, substantially as specified for the purpose described.

14. In combination, a frame having projecting portions, a rotatable rim, a ring, coöperating cogs between the rim and ring constructed to ride past one another, an annulus, links connecting the annulus with the ring, and other links connecting the annulus with the projections of the frame, substantially as set forth for the purpose described.

15. In combination, a vibrating arm, a lever having pivotal connection with the vibrating arm and adapted to oscillate therewith, means for imparting an oscillatory movement to the said lever, and a vibrating guide for causing the oscillating lever to move in a plane at right angles to the movement of the vibrating arm, substantially in the manner set forth for the purpose described.

16. In combination, a power-driven axle, a frame mounted thereon, an arm having pivotal connection with the frame and adapted to vibrate in a plane approximately parallel therewith, a lever having pivotal connection with the arm so as to vibrate therewith and adapted to have an independent oscillatory movement at right angles to the plane of movement of the said arm, a ring or like part positively actuated by means of the power-driven axle, a journal extending laterally from the said lever and making connection with the ring, and a vibrating guide for controlling the movement of the lever, substantially in the manner set forth for the purpose specified.

17. In combination, a vibrating ring, an oscillating lever, a laterally-extending journal between the ring and lever and having a ball-and-socket connection with the said ring, and a vibrating guide coöperating with the oscillating lever, substantially as and for the purpose set forth.

In testimony that I claim the foregoing as my own I have hereto affixed my signature in the presence of two witnesses.

FRED BOWER.

Witnesses:
JOHN P. HUME,
HENRY HORN.